(No Model.)

R. BRIGGS.
SPARK ARRESTER.

No. 587,425.

Patented Aug. 3, 1897.

WITNESSES

INVENTOR
Richard Briggs.
Attorney

UNITED STATES PATENT OFFICE.

RICHARD BRIGGS, OF MELVIN, MICHIGAN.

SPARK-ARRESTER.

SPECIFICATION forming part of Letters Patent No. 587,425, dated August 3, 1897.

Application filed March 17, 1897. Serial No. 627,907. (No model.)

*To all whom it may concern:*

Be it known that I, RICHARD BRIGGS, a citizen of the United States, residing at Melvin, in the county of Sanilac and State of Michigan, have invented certain new and useful Improvements in Spark-Arresters for Steam-Engines; and I do hereby declare the following to be a full, clear, and exact description of the invention, such as will enable others skilled in the art to which it appertains to make and use the same.

The object of this invention is to provide a spark-arrester for locomotives or other steam-engines in which passages are formed to direct the smoke or products of combustion onto the surface of the water contained within a suitable chamber or reservoir supported by the smoke-stack.

Having the above objects in view, my invention consists in providing the smoke-stack with a water-chamber, a deflector for directing the smoke onto the surface of the water, and a second deflector for further arresting the course of the smoke.

The invention further consists in the particular construction and combination of the parts, as will be hereinafter fully set forth, and specifically pointed out in the claims.

Figure 1:
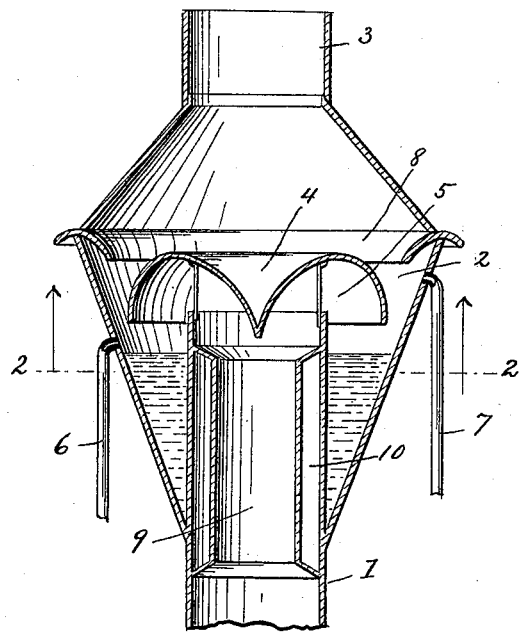
Figure 2:
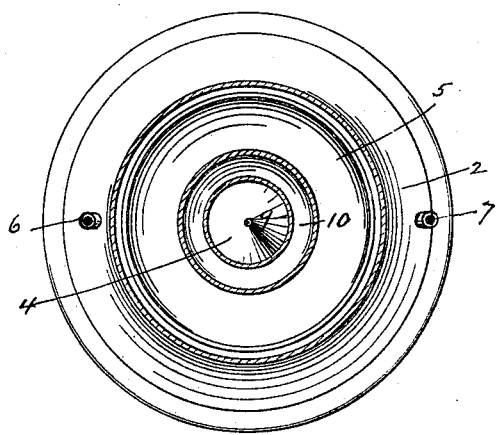

In the accompanying drawings, forming part of this specification, Figure 1 is a vertical sectional view through a smoke-stack supplied with my improved attachments. Fig. 2 is a transverse sectional view on the line 2 2 of Fig. 1, looking in the direction of the arrow.

Referring to the drawings by numerals, 1 designates the main smoke-pipe, to the upper end of which is rigidly secured a casing or top 2, the sides of which extend outwardly from the main smoke-pipe and then inwardly to connect with the upper ring or outlet 3. The main smoke-pipe 1 terminates at its upper end within this casing 2 on a plane below that of the junction between the oppositely-inclined walls of said casing, and above this end of the smoke-pipe is located a deflector-plate or cap 4, funnel-shaped, as shown, and extended over to direct the smoke into the lower end of the casing. This funnel-shaped deflector or cap is supported by rods 5, rigidly connected to and extending upwardly from the smoke-pipe 1. The lower part of the casing is adapted to contain water to a certain level maintained by an outlet or overflow pipe 6, the water being supplied by the pipe 7, which may be extended from any source. By this arrangement it will be noted that the smoke which is deflected by the funnel-shaped deflector 4 will strike upon the surface of the water contained within the lower part of the casing and any sparks or live cinders will be put out before the smoke passes out through the outlet end 3 of the smoke-stack.

In connection with an arrester constructed as hereinbefore described I provide a second deflector 8, which extends from the inner side of the casing 2 and is curved downward, as shown, this deflector being for the purpose of arresting any sparks or live cinders that may not be completely put out by the water. I also provide a supplemental pipe or tube 9, located within the main smoke-pipe 1, adjoining the water-chamber, to provide a dead-air space 10, that will prevent the water becoming too hot by direct contact with the smoke-pipe.

From the foregoing description, in connection with the accompanying drawings, it will be seen that I provide an effective spark-arrester that will arrest the products of combustion and direct the same upon the surface of the water, so that any sparks or live cinders will be put out before passing beyond the outlet-opening of the smoke-stack. By the employment of this device there is no danger of fire where engines are used in threshing or other places where sparks or live coals are likely to set fire to a haystack or other inflammable material. The same construction could be used in connection with locomotive smoke-stacks to prevent live sparks passing beyond the outlet.

Having thus described my invention, what I claim as new, and desire to secure by Letters Patent, is—

1. In a spark-arrester, the combination with the main smoke-pipe 1, of a casing 2 secured to the upper end thereof and presenting a water-chamber surrounding the said upper end of the smoke-pipe, a funnel-shaped deflector mounted above the smoke-pipe and presenting depending sides which direct the smoke or products of combustion upon the surface of the water, and a pipe located within the main pipe and connected thereto at its ends to provide a dead-air space on a line with the water-chamber, together with a supply-pipe for the water-chamber and an overflow-pipe, substantially as shown and for the purpose set forth.

2. In a spark-arrester, the combination with the main pipe 1, of a casing secured thereto and presenting oppositely-inclined side walls and presenting a water space or chamber surrounding the upper end of the main pipe, a tube or pipe located within the main pipe to form a dead-air space on a line with the water-chamber; a funnel-shaped deflector located above the main smoke-pipe and having depending extensions to direct the smoke or products of combustion upon the surface of the water, a second deflector secured to the inner side of the casing and projecting downward therefrom, and an outlet ring or section secured to the upper end of the chamber; together with the supply-pipe and the overflow-pipe to maintain a level of water within the casing, substantially as shown and for the purpose set forth.

In testimony whereof I have signed this specification in the presence of two subscribing witnesses.

RICHARD BRIGGS.

Witnesses:
MYRON H. GROAT,
FRANK DEWEY.